United States Patent
Yi et al.

(10) Patent No.: US 10,396,582 B2
(45) Date of Patent: Aug. 27, 2019

(54) MASTER SLAVE CHARGING ARCHITECTURE WITH COMMUNICATION BETWEEN CHARGERS

(71) Applicant: Maxim Integrated Products, Inc., San Jose, CA (US)

(72) Inventors: Guoying Yi, Milpitas, CA (US); Rudy Kurniawan, Singapore (SG); Yayue Zhang, Singapore (SG); Sungil Ha, Palo Alto, CA (US); Haitao Hu, San Carlos, CA (US); Guang Zhang, San Diego, CA (US); John Hu, San Diego, CA (US); Chin Boon Huam, Singapore (SG); Jia Hu, San Jose, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 314 days.

(21) Appl. No.: 15/198,326

(22) Filed: Jun. 30, 2016

(65) Prior Publication Data
US 2017/0005501 A1    Jan. 5, 2017

Related U.S. Application Data

(60) Provisional application No. 62/187,331, filed on Jul. 1, 2015.

(51) Int. Cl.
*H02J 7/00* (2006.01)

(52) U.S. Cl.
CPC .......... *H02J 7/0083* (2013.01); *H02J 7/0029* (2013.01); *H02J 7/0081* (2013.01); *H02J 2007/0001* (2013.01)

(58) Field of Classification Search
CPC ....... H02J 7/0083; H02J 7/0029; H02J 7/0081
USPC ......................................................... 320/106
See application file for complete search history.

(56) References Cited

U.S. PATENT DOCUMENTS

| | | | | |
|---|---|---|---|---|
| 3,947,705 A * | 3/1976 | Emmons | ............... | G11C 27/04 327/91 |
| 4,607,208 A * | 8/1986 | Vreeland | ............... | H02J 7/0085 320/145 |
| 5,166,596 A * | 11/1992 | Goedken | ............... | H02J 7/0091 320/150 |
| 5,281,920 A * | 1/1994 | Wurst | ................ | G01R 31/3662 320/126 |
| 5,563,455 A * | 10/1996 | Cheng | ....................... | H02J 3/14 307/38 |
| 5,670,863 A * | 9/1997 | Broell | .................... | H02J 7/0073 320/145 |
| 5,955,867 A * | 9/1999 | Cummings | ........... | H02J 7/0024 320/107 |
| 6,291,972 B1 * | 9/2001 | Zhang | ................... | H02J 7/0018 320/116 |

(Continued)

FOREIGN PATENT DOCUMENTS

GB    2545923 A  *  7/2017

*Primary Examiner* — Robert J Grant
*Assistant Examiner* — John T Trischler (57) ABSTRACT

A battery charging system includes a master charger that receives a supply voltage, outputs a master charging current based on the supply voltage, and selectively outputs a slave charger control signal. At least one slave charger receives the slave charger control signal from the master charger, receives the supply voltage, and selectively outputs a slave charging current based on the slave charger control signal and the supply voltage.

16 Claims, 8 Drawing Sheets

(56) References Cited

U.S. PATENT DOCUMENTS

| | | | | |
|---|---|---|---|---|
| 6,774,604 B2* | 8/2004 | Matsuda | G06F 1/263 | 320/110 |
| 7,135,836 B2* | 11/2006 | Kutkut | H02J 7/022 | 320/116 |
| 7,135,837 B2* | 11/2006 | Patino | H02J 7/0013 | 320/125 |
| 7,193,392 B2* | 3/2007 | King | B60L 11/185 | 320/118 |
| 7,245,108 B2* | 7/2007 | Chertok | B60L 11/185 | 320/132 |
| 7,378,818 B2* | 5/2008 | Fowler | B60L 11/185 | 320/108 |
| 7,511,457 B2* | 3/2009 | Emori | B60L 3/0046 | 320/116 |
| 7,535,195 B1* | 5/2009 | Horovitz | H01M 10/44 | 320/106 |
| 7,554,292 B2* | 6/2009 | Veselic | H02J 7/022 | 320/116 |
| 7,589,498 B2* | 9/2009 | Choy | H02J 1/102 | 320/119 |
| 7,612,539 B2* | 11/2009 | Woo | H02J 7/0073 | 320/148 |
| 7,615,966 B2* | 11/2009 | Houldsworth | H02J 7/0016 | 320/118 |
| 7,911,178 B2* | 3/2011 | Kawata | B60L 11/1868 | 320/116 |
| 8,013,570 B2* | 9/2011 | Baxter | B60L 3/0084 | 320/109 |
| 8,054,034 B2* | 11/2011 | Lim | H02J 7/0016 | 320/101 |
| 8,093,862 B2* | 1/2012 | Mariels | H02J 7/0016 | 320/116 |
| 8,115,453 B2* | 2/2012 | Houldsworth | H02J 7/0016 | 320/118 |
| 8,129,950 B2* | 3/2012 | Colin | H01M 10/482 | 320/134 |
| 8,193,763 B2* | 6/2012 | Kawata | B60L 11/1868 | 320/107 |
| 8,212,571 B2* | 7/2012 | Emori | B60L 11/1855 | 320/118 |
| 8,228,040 B2* | 7/2012 | Utsumi | H01M 10/4207 | 320/116 |
| 8,232,765 B2* | 7/2012 | Billmaier | H02J 3/02 | 320/109 |
| 8,319,478 B2* | 11/2012 | Humphrey | B60L 3/0069 | 320/138 |
| 8,339,099 B2* | 12/2012 | Emori | B60L 3/0046 | 320/116 |
| 8,350,529 B2* | 1/2013 | Loncarevic | H02J 7/0016 | 320/118 |
| 8,401,473 B2* | 3/2013 | Tang | H04W 99/00 | 320/149 |
| 8,426,047 B2* | 4/2013 | Emori | H02J 7/0019 | 307/10.1 |
| 8,436,575 B2* | 5/2013 | Sim | H01M 10/482 | 320/106 |
| 8,436,579 B2* | 5/2013 | Veselic | H02J 7/022 | 320/116 |
| 8,487,581 B2* | 7/2013 | Tan | G01R 31/386 | 320/103 |
| 8,547,065 B2* | 10/2013 | Trigiani | H02J 7/0018 | 320/118 |
| 8,552,589 B2* | 10/2013 | Ghosh | H02J 9/062 | 307/64 |
| 8,552,704 B2* | 10/2013 | Kiadeh | H02M 3/1584 | 323/285 |
| 8,648,566 B2* | 2/2014 | Billmaier | H02J 3/02 | 320/109 |
| 8,723,478 B2* | 5/2014 | Billmaier | H02J 3/02 | 320/109 |
| 8,729,731 B2* | 5/2014 | Roepke | H02J 9/061 | 307/64 |
| 8,766,597 B2* | 7/2014 | Nork | B60L 11/1866 | 320/118 |
| 8,773,078 B2* | 7/2014 | Yu | H02J 7/0052 | 320/148 |
| 8,786,256 B2* | 7/2014 | Emori | B60L 3/0046 | 320/116 |
| 8,791,668 B2* | 7/2014 | Emori | B60L 3/0046 | 320/118 |
| 8,796,990 B2* | 8/2014 | Paparo | H01F 38/14 | 320/108 |
| 8,798,832 B2* | 8/2014 | Kawahara | H01M 10/441 | 701/22 |
| 8,810,217 B2* | 8/2014 | Malmberg | H02J 1/102 | 323/272 |
| RE45,208 E* | 10/2014 | Humphrey | B60L 3/0069 | 320/138 |
| 8,884,584 B2* | 11/2014 | Emori | B60L 3/0046 | 320/116 |
| 8,912,756 B2* | 12/2014 | Emori | B60L 3/0046 | 320/116 |
| 8,912,758 B2* | 12/2014 | Kang | H02J 7/0042 | 320/116 |
| 8,994,338 B2* | 3/2015 | Khan | B60L 11/1816 | 307/10.1 |
| 9,000,935 B2* | 4/2015 | Dao | H04Q 9/00 | 320/107 |
| 9,035,600 B2* | 5/2015 | Park | G06F 1/263 | 320/108 |
| 9,093,724 B2* | 7/2015 | Fujitake | H01M 10/44 | |
| 9,276,430 B2* | 3/2016 | Sporck | H02J 7/007 | |
| 9,331,497 B2* | 5/2016 | Beaston | H01M 10/4207 | |
| 9,362,759 B2* | 6/2016 | Nakao | B60L 11/1864 | |
| 9,373,979 B2* | 6/2016 | Ghosh | H02J 9/062 | |
| 9,436,261 B2* | 9/2016 | Yun | G06F 1/3212 | |
| 9,446,679 B2* | 9/2016 | Kataoka | B60L 11/1851 | |
| 9,525,293 B2* | 12/2016 | Ito | H02J 7/0027 | |
| 9,537,336 B2* | 1/2017 | Suzuki | H02J 7/0027 | |
| 9,537,402 B2* | 1/2017 | Kurauchi | H02M 3/285 | |
| 9,559,389 B2* | 1/2017 | Greef | H01M 10/425 | |
| 9,590,436 B2* | 3/2017 | Sporck | H02J 7/0052 | |
| 9,608,518 B2* | 3/2017 | Yin | H02M 3/155 | |
| 9,641,002 B2* | 5/2017 | Lavender | H02J 1/10 | |
| 9,647,463 B2* | 5/2017 | Brandl | H02J 7/00 | |
| 9,647,475 B2* | 5/2017 | Sun | H02J 7/0052 | |
| 9,673,640 B2* | 6/2017 | Kudo | H02J 7/0016 | |
| 9,748,830 B1* | 8/2017 | Soleno | H02J 1/102 | |
| 9,755,517 B2* | 9/2017 | Kobayashi | H02M 3/158 | |
| 9,780,593 B2* | 10/2017 | Utsumi | H02J 7/007 | |
| 9,899,859 B2* | 2/2018 | Sporck | H02J 7/0072 | |
| 9,937,812 B1* | 4/2018 | Billmaier | H02J 3/02 | |
| 9,948,094 B1* | 4/2018 | Sheng | H02J 1/00 | |
| 2003/0030412 A1* | 2/2003 | Matsuda | G06F 1/263 | 320/127 |
| 2004/0135544 A1* | 7/2004 | King | B60L 11/185 | 320/116 |
| 2004/0189251 A1* | 9/2004 | Kutkut | H02J 7/022 | 320/128 |
| 2005/0007075 A1* | 1/2005 | Woo | H02J 7/0073 | 320/148 |
| 2005/0024015 A1* | 2/2005 | Houldsworth | H02J 7/0016 | 320/119 |
| 2005/0134219 A1* | 6/2005 | Patino | H02J 7/0013 | 320/116 |
| 2005/0242667 A1* | 11/2005 | Emori | B60L 3/0046 | 307/10.1 |
| 2005/0242776 A1* | 11/2005 | Emori | B60L 11/1855 | 320/116 |
| 2007/0046261 A1* | 3/2007 | Porebski | G01R 31/3641 | 320/132 |
| 2008/0007218 A1* | 1/2008 | Veselic | H02J 7/0022 | 320/116 |
| 2008/0090133 A1* | 4/2008 | Lim | H02J 7/0016 | 429/50 |
| 2008/0219337 A1* | 9/2008 | Kawata | B60L 11/1868 | 375/225 |
| 2008/0258685 A1* | 10/2008 | Choy | H02J 1/102 | 320/132 |

(56) References Cited

U.S. PATENT DOCUMENTS

| | | | |
|---|---|---|---|
| 2009/0085516 A1* | 4/2009 | Emori | B60L 3/0046 320/118 |
| 2009/0091332 A1* | 4/2009 | Emori | B60L 11/1855 324/537 |
| 2009/0146610 A1* | 6/2009 | Trigiani | H02J 7/0018 320/119 |
| 2009/0224769 A1* | 9/2009 | Emori | B60L 3/0046 324/426 |
| 2009/0230920 A1* | 9/2009 | Veselic | H02J 7/0022 320/116 |
| 2010/0007311 A1* | 1/2010 | Colin | H01M 10/4207 320/134 |
| 2010/0019732 A1* | 1/2010 | Utsumi | H01M 10/4207 320/136 |
| 2010/0052614 A1* | 3/2010 | Mariels | H02J 7/0016 320/116 |
| 2010/0052615 A1* | 3/2010 | Loncarevic | H02J 7/0016 320/118 |
| 2010/0109610 A1* | 5/2010 | Houldsworth | H02J 7/0016 320/132 |
| 2010/0134067 A1* | 6/2010 | Baxter | B60L 3/0084 320/109 |
| 2010/0198440 A1* | 8/2010 | Fujitake | H01M 10/44 701/22 |
| 2011/0156640 A1* | 6/2011 | Moshfeghi | H02J 50/20 320/108 |
| 2011/0175574 A1* | 7/2011 | Sim | H01M 10/425 320/121 |
| 2011/0187326 A1* | 8/2011 | Kawata | B60L 11/1868 320/116 |
| 2011/0204845 A1* | 8/2011 | Paparo | H01F 38/14 320/108 |
| 2011/0221393 A1* | 9/2011 | Billmaier | H02J 3/02 320/109 |
| 2011/0234165 A1* | 9/2011 | Palatov | H02J 7/0004 320/119 |
| 2011/0273144 A1* | 11/2011 | Yu | H02J 7/0052 320/162 |
| 2011/0313613 A1* | 12/2011 | Kawahara | H01M 10/441 701/34.4 |
| 2012/0019193 A1* | 1/2012 | Yu | G06F 1/266 320/103 |
| 2012/0038324 A1* | 2/2012 | Humphrey | B60L 3/0069 320/138 |
| 2012/0056584 A1* | 3/2012 | Mariels | H02J 7/0016 320/109 |
| 2012/0056585 A1* | 3/2012 | Mariels | H02J 7/0016 320/116 |
| 2012/0119707 A1* | 5/2012 | Utsumi | H01M 10/4207 320/136 |
| 2012/0126820 A1* | 5/2012 | Tan | G01R 31/386 324/434 |
| 2012/0161697 A1* | 6/2012 | Park | G06F 1/263 320/108 |
| 2012/0169311 A1* | 7/2012 | Malmberg | H02J 1/102 323/272 |
| 2012/0181983 A1* | 7/2012 | Khan | B60L 11/1816 320/109 |
| 2012/0313434 A1* | 12/2012 | Billmaier | H02J 3/02 307/35 |
| 2012/0319649 A1* | 12/2012 | Billmaier | H02J 3/02 320/109 |
| 2013/0057076 A1* | 3/2013 | Lavender | H02J 1/10 307/80 |
| 2013/0099746 A1* | 4/2013 | Nork | B60L 11/1866 320/118 |
| 2013/0106356 A1* | 5/2013 | Nakao | B60L 11/1864 320/118 |
| 2013/0113428 A1* | 5/2013 | Emori | B60L 3/0046 320/118 |
| 2013/0119936 A1* | 5/2013 | Emori | B60L 3/0046 320/118 |
| 2013/0187603 A1* | 7/2013 | Kadie | H02J 5/00 320/112 |
| 2013/0187604 A1* | 7/2013 | Kadie | H02J 7/0052 320/112 |
| 2013/0207609 A1* | 8/2013 | Emori | B60L 3/0046 320/116 |
| 2013/0207613 A1* | 8/2013 | Loncarevic | H02J 7/0016 320/134 |
| 2013/0214740 A1* | 8/2013 | Emori | B60L 3/0046 320/118 |
| 2013/0249475 A1* | 9/2013 | Kang | H02J 7/0042 320/107 |
| 2013/0249480 A1* | 9/2013 | Paparo | H01F 38/14 320/108 |
| 2013/0328530 A1* | 12/2013 | Beaston | H01M 10/4207 320/128 |
| 2014/0018990 A1* | 1/2014 | Kataoka | B60L 11/1851 701/22 |
| 2014/0028098 A1* | 1/2014 | Trigiani | H02J 7/0018 307/39 |
| 2014/0035532 A1* | 2/2014 | Brandl | H02J 7/0016 320/128 |
| 2014/0049225 A1* | 2/2014 | Utsumi | H01M 10/4207 320/136 |
| 2014/0062401 A1* | 3/2014 | Gadh | B60L 11/1838 320/109 |
| 2014/0252847 A1* | 9/2014 | Yang | B60R 16/03 307/9.1 |
| 2014/0266039 A1* | 9/2014 | Dougherty | B60L 11/1844 320/109 |
| 2014/0340042 A9* | 11/2014 | Emori | B60L 3/0046 320/116 |
| 2014/0347001 A1* | 11/2014 | Sporck | H02J 7/007 320/107 |
| 2014/0347003 A1* | 11/2014 | Sporck | H02J 7/0052 320/107 |
| 2014/0354236 A1* | 12/2014 | Kim | H02J 7/0016 320/134 |
| 2014/0361740 A1* | 12/2014 | Suzuki | H02J 7/0027 320/108 |
| 2014/0365792 A1* | 12/2014 | Yun | G06F 1/3212 713/320 |
| 2015/0333636 A1* | 11/2015 | Kurauchi | H02M 3/285 363/17 |
| 2015/0357851 A1* | 12/2015 | Huang | H02J 7/025 320/108 |
| 2016/0009182 A1* | 1/2016 | Nakanishi | B60L 3/12 701/22 |
| 2016/0049813 A1* | 2/2016 | Takizawa | H01M 10/441 320/112 |
| 2016/0082856 A1* | 3/2016 | Baxter | B60L 3/0084 320/109 |
| 2016/0149431 A1* | 5/2016 | Sporck | H02J 7/007 320/107 |
| 2016/0218618 A1* | 7/2016 | Yin | H02M 3/155 |
| 2017/0028868 A1* | 2/2017 | Minamiura | B60L 58/14 |
| 2017/0063123 A1* | 3/2017 | Horie | H02J 7/0054 |
| 2017/0070067 A1* | 3/2017 | Suzuki | H02J 7/0027 |
| 2017/0070068 A1* | 3/2017 | Ito | H02J 7/0027 |
| 2017/0133862 A1* | 5/2017 | Jung | H01M 10/4257 |
| 2018/0026467 A1* | 1/2018 | Shin | H02J 7/0068 |
| 2018/0097369 A1* | 4/2018 | Madhavi | H02J 7/0004 |
| 2018/0331564 A1* | 11/2018 | Song | H02J 7/163 |
| 2018/0334051 A1* | 11/2018 | Samojeden | B60L 11/1844 |
| 2019/0013685 A1* | 1/2019 | Mallapur | H02J 7/0052 |
| 2019/0097277 A1* | 3/2019 | Fukae | H01M 10/44 |

\* cited by examiner

MASTER SLAVE CHARGING ARCHITECTURE WITH COMMUNICATION BETWEEN CHARGERS

CROSS-REFERENCE TO RELATED APPLICATIONS

This application claims the benefit of U.S. Provisional Application No. 62/187,331, filed on Jul. 1, 2015. The entire disclosure of the application referenced above is incorporated herein by reference.

FIELD

The present disclosure relates to electronic devices, and more particularly to electronic devices including one or more chargers for charging a battery.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electronic devices (e.g., smartphones, tablet or laptop computers, media players, etc.) are typically powered by a rechargeable battery. Accordingly, an electronic device may include a charger for receiving a voltage from an external source (e.g., from a power outlet via a plug-in power supply adapter) and providing current to the battery to recharge the battery.

For example only, in some implementations, a single charger configured for rapid charging may be used to charge the battery. In other implementations, the electronic device may include two or more chargers operating in parallel. The two or more chargers operate, and are controlled by an external processor, independently.

SUMMARY

A battery charging system includes a master charger that receives a supply voltage, outputs a master charging current based on the supply voltage, and selectively outputs a slave charger control signal. At least one slave charger receives the slave charger control signal from the master charger, receives the supply voltage, and selectively outputs a slave charging current based on the slave charger control signal and the supply voltage.

A method for operating a battery charging system includes, using a master charger, receiving a supply voltage, outputting a master charging current based on the supply voltage, and selectively outputting a slave charger control signal. The method further includes, using at least one slave charger, receiving the slave charger control signal from the master charger; receiving the supply voltage, and selectively outputting a slave charging current based on the slave charger control signal and the supply voltage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A battery charging system of an electronic device according to the principles of the present disclosure implements a first charger and one or more second chargers. The first charger operates as a master device with respect to the second chargers. In other words, the first charger and the second chargers correspond to, respectively, a master charger and slave chargers in a master-slave relationship.

The master charger may communicate with a control module of the electronic device (e.g., a host or application processor). The control module may communicate only with the master charger (e.g., with no direct communication between the control module and the slave chargers) to control operating parameters related to the charging of the battery. The master charger communicates with the slave chargers independently of the control module to selectively adjust operating parameters of the slave chargers. For example, the master charger may selectively enable and disable and adjust a current output of the slave chargers according to type of battery (e.g., high capacity batteries, high charge rate batteries, etc.) and/or other measured or desired operating parameters (e.g., load sharing, thermal balancing, temperature protection, etc.). The slave chargers communicate with the master charger independently of the control module to report various respective operation statuses (e.g., charging current, die temperature, etc.) and fault detection (thermal fault, over-current fault, over-voltage fault, etc.). The master charger alone may communicate with the control module to report the operation status and fault detection of the master charger as well as those of the slave chargers.

Figure 1A:
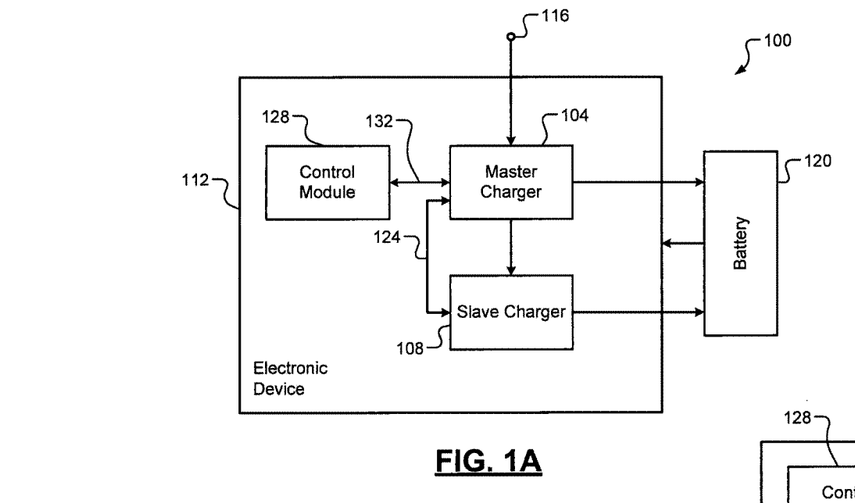
FIG. 1A is an example battery charging system including a slave charger according to the principles of the present disclosure.
Figure 1B:
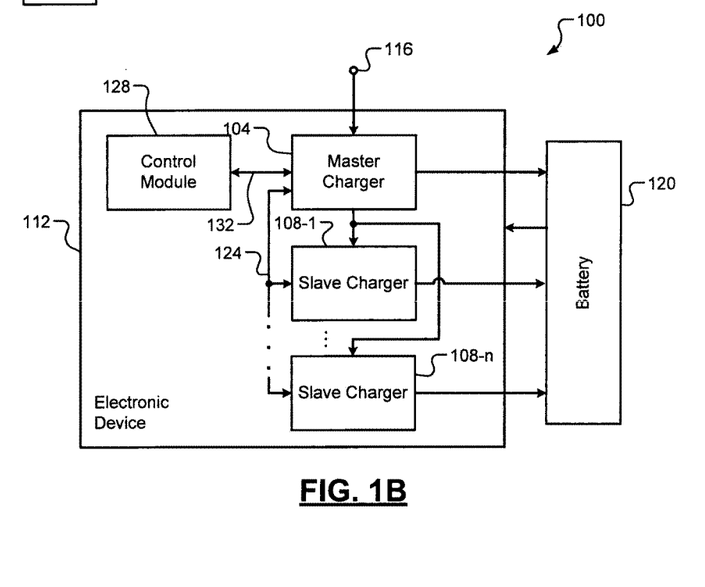
FIG. 1B is an example battery charging system including multiple slave chargers according to the principles of the present disclosure.

FIGS. 1A and 1B show embodiments of an example battery charging system 100. In FIG. 1A, the example battery charging system 100 includes a master charger 104 and a slave charger 108 located in an electronic device 112. For example, the electronic device 112 may correspond to a smartphone or other mobile electronic device. In FIG. 1B, the example battery charging system 100 includes slave chargers 108-1, . . . , and 108-$n$ (i.e., n slave chargers, referred to collectively as slave chargers 108). As described herein, the principles of the present disclosure may be implemented with one slave charger 108 as shown in FIG. 1A and/or with more than one of the slave chargers 108 as shown in FIG. 1B.

The master charger 104 receives a supply voltage (e.g., 5 V, 7 V, 9 V, 12 V, 20 V, etc.) from a voltage source 116. For example, the voltage source 116 corresponds to a plug-in adapter connected to a standard wall outlet or other source. The master charger 104 selectively provides current to charge a battery 120 according to the received supply voltage. As shown, the master charger 104 also provides the supply voltage to the slave charger 108. However, in some examples, the slave charger 108 may independently receive the supply voltage from the voltage source 116. The battery 120 provides power to the electronic device 112. The battery 120 may correspond to a single cell battery, multiple battery cells connected in series, etc.

The master charger 104 communicates with the slave charger 108 to control charging provided from the slave charger 108 to the battery 120. For example, the master charger 104 may communicate with the slave charger 108 via an interface 124, which may correspond to a single pin/wire serial interface or any other suitable communication interface (e.g., a multi-pin/wire interface). The interface 124 may be bi-directional, allowing the slave charger 108 to provide information to the master charger 104. Using the interface 124, the master charger 104 may selectively enable and disable the current output provided by the slave charger 108 for charging the battery 120. In some examples, the slave charger 108 may be further configured to adjust the amount of the current provided to the battery 120 based on commands received from the master charger 104 via the interface 124. For example, the master charger 104 controls the slave charger 108 to selectively enable and disable and/or adjust the current provided by the slave charger 108 according to load sharing requirements, thermal balancing, etc. For example only, in various modes, the current provided by the slave charger 108 may be less than, the same as, or greater than the current provided by the master charger 104.

The master charger 104 may communicate with a control module 128 via an interface 132. For example, the control module 128 may correspond to a host or application processor of the electronic device 112. The interface 132 may correspond to an I$^2$C protocol or other suitable communication interface.

In this manner, the master charger 104 can control the slave charger 108 via the interface 124 to selectively provide a fast charging current to the battery 120. For example only, the master charger 104 may selectively enable and disable the slave charger 108 in various modes or states and based on various operating conditions. For example, the master charger 104 may control the charging provided by the slave charger 108 according to an adaptive input current limit (AICL), which may correspond to an adjustable maximum charging current to be provided to the battery 120. The various modes include, but are not limited to, a dead battery mode, a constant current (CC) mode, a constant voltage (CV) mode, a charge top-off mode, and/or a charging complete mode. For example, the slave charger 108 may be enabled during the CC mode, selectively enabled in the CV mode, and disabled in the dead battery mode, the charge top-off mode, and/or the charging complete mode. Accordingly, the master charger 104 may be configured to determine the AICL and control operation during the dead battery mode, the charge top-off mode, and/or the charging complete mode without the slave charger 108.

In some examples, the slave charger 108 may include one or more controlled current sources configured to selectively provide the charging current to the battery 120. The slave charger 108 may implement various protections including, but not limited to, input under and/or over voltage protection, input to output low headroom protection, battery overvoltage protection, output undervoltage protection, thermal regulation, and/or thermal shutdown protection. In other words, the slave charger 108 may be configured to, independent of the master charger 104 (e.g., commands received from the master charger 104), automatically disable and/or adjust the charging current in response to detecting various conditions.

Figure 2:
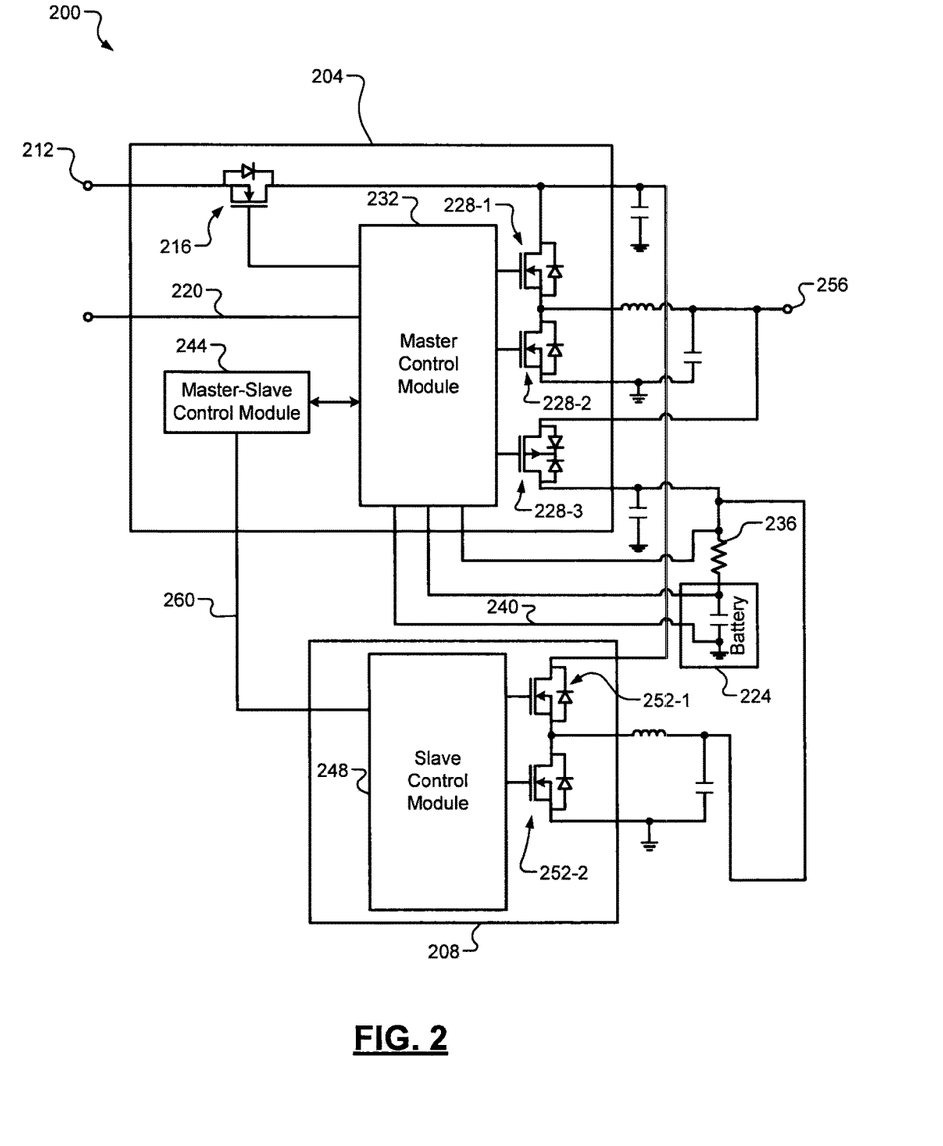
FIG. 2 is an example battery charging system including a master charger and a slave charger according to the principles of the present disclosure.

Referring now to FIG. 2, an example battery charging system 200 including a master charger 204 and a slave charger 208 are shown in more detail. The master charger 204 receives a supply voltage 212 via voltage input switch 216. The master charger 204 selectively turns the voltage input switch 216 ON or OFF to connect the supply voltage 212 to the master charger 204 and the slave charger 208. For example, the master charger 204 may control the ON or OFF state of the voltage input switch 216 based on various operating modes of the battery charging system 200, detected operating conditions, commands received from a host or application processor via interface 220, etc. The master charger 204 and the slave charger 208 provide charging current to battery 224 based on the supply voltage 212.

The master charger 204 includes one or more charging switches 228-1, 228-2, and 228-3, referred to collectively as charging switches 228. Although three of the switches 228 are shown, those skilled in the art can appreciate that another number of switches (e.g., only one or two switches), other types of switches (e.g., NMOS, PMOS, etc.), and/or other configurations of the switches 228 may be used to provide a charging current from the master charger 204 to the battery 224. A master control module 232 selectively turns the switches 228 ON and OFF to control the charging current provided to the battery 224. The master control module 232 may receive feedback from the battery 224 and further control the charging current based on the feedback. For example only, the feedback may include a voltage across a sense resistor 236, which is indicative of a total charging current provided to the battery 224 by the master charger 204 and the slave charger 208. In other examples, the feedback may include other indicators of the total charging current provided to the battery 224, and/or the master control module 232 may implement other methods for sensing the current provided to the battery (e.g., including both lossy and lossless current sensing methods). The feedback may also include a ground sensing signal 240. The master control module 232 may communicate directly with the slave charger 208, and/or the master charger 204 may include a master-slave control module 244 for communicating with the slave charger 208.

The slave charger 208 includes a slave control module 248 for controlling charging switches 252-1 and 252-2, referred to collectively as charging switches 252. Although two of the switches 252 are shown, those skilled in the art can appreciate that another number of switches (e.g., one or three or more switches), other types of switches (e.g., NMOS, PMOS, etc.), and/or other configurations of the switches 252 may be used to provide a charging current from the slave charger 208 to the battery 224. For example, the charging switches 252 may include a switch analogous to the switch 228-3 of the master charger 204. The switches 252 receive the supply voltage from the master charger 204 (via the switch 216) and provide the charging current to the battery 224 accordingly. In other words, the switches 252 operate as a constant current source responsive to the slave control module 248. The total charging current supplied to the battery 224 corresponds to a sum of the charging currents provided by the master charger 204 and the slave charger 208. The charging currents provided by the master charger 204 and the slave charger 208 may be the same or different based on the control of the master charger 204. The battery 224 (and/or the master charger 204) provides power to output node 256 (i.e., to provide power to various components of an electronic device).

The master charger 204 provides commands from the master control module 232 and/or the master-slave control module 244 to the slave charger 208 via interface 260. For example, the master charger 204 selectively enables and disables the slave charger 208 and/or adjusts the charging current output by the slave charger 208 based on various operating modes and conditions. In this manner, the master charger 204, not an external host or application processor, controls operation of the slave charger 208.

In some examples, the battery charging system 200 implements thermal balancing. For example, the master control module 232 and/or the slave control module 248 monitor temperatures of components of the battery charging system 200 and/or components in the electronic device in the vicinity of the battery charging system 200 and adjust respective charging currents of the master charger 204 and the slave charger 208 accordingly. For example only, the battery charging system 200 may decrease the charging current of the slave charger 208 and increase the charging current of the master charger 204 while maintaining the same total charging current to reduce temperatures associated with the slave charger 208. Conversely, the battery charging system 200 may decrease the charging current of the master charger 204 and increase the charging current of the slave charger 208 while maintaining the same total charging current to reduce temperatures associated with the master charger 204.

Figure 3:
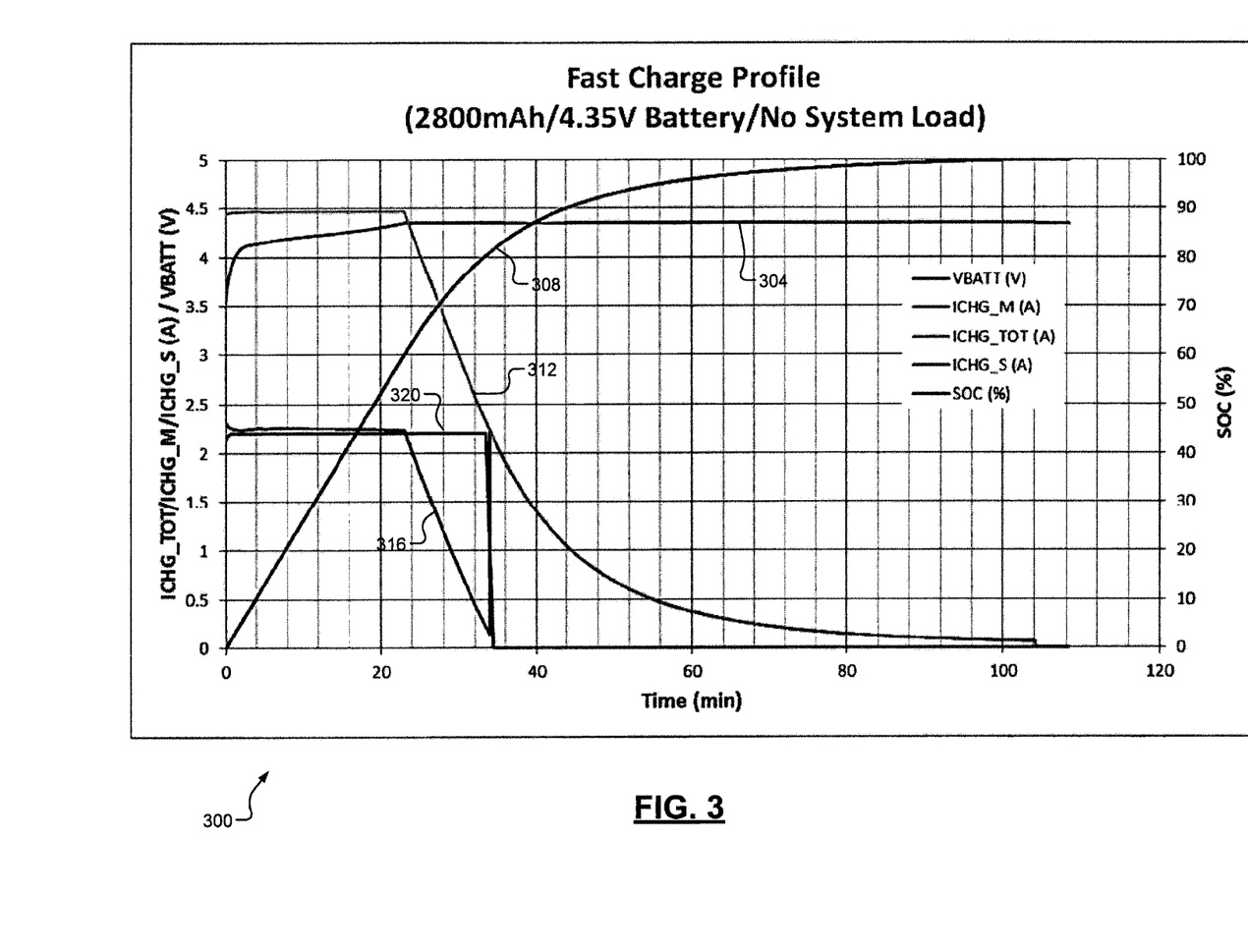
FIG. 3 illustrates an example fast charge profile according to the principles of the present disclosure.

Referring now to FIG. 3, an example fast charge profile 300 illustrates a battery voltage 304, a battery state of charge 308, a total charging current 312, a master charging current 316, and a slave charging current 320. As shown, a peak fast charge current is approximately 4.5 amps. In some examples, the master charging current 316 ramps down when the battery voltage 304 and/or the battery state of charge 308 reach a first threshold while the slave charging current 320 is maintained. The master charger enters a top-off mode and disables (i.e., turns off) the slave charger when the battery voltage 304 and/or the battery state of charge 308 reach a second threshold. In other examples, the slave charging current 320 may be disabled (e.g., the master charger may disable the slave charger) at any time after the battery voltage 304 and/or the battery state of charge 308 reach a first threshold and an associated charging current starts to ramp down.

In embodiments with multiple slave chargers (for example only, two slave chargers), in some modes the maximum charging current provided by the master charger may correspond to a first value (e.g., 3 amps) while the respective maximum charging currents provided by the slave chargers may correspond to a second value (e.g., 1.5 amps). In an example mode, the sum of the maximum respective charging currents provided by the slave chargers may be approximately equal to the maximum charging current provided by the master charger.

In embodiments, the respective charging currents provided by the slave chargers may be automatically adjusted according to the charging current provided by the master charger. For example, the respective charging currents provided by the slave chargers may be automatically adjusted to maintain a relationship where the sum of the respective charging currents provided by the slave chargers corresponds to the charging current provided by the master charger. The charging currents of the master charger and the slave charger may be updated (e.g., decreased) as the state of charge of the battery increases.

Figure 4A:
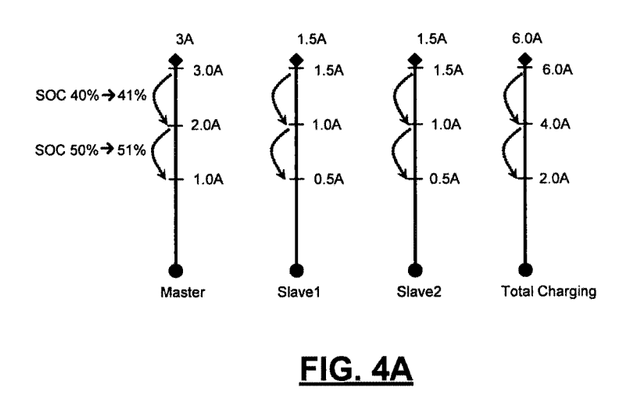
FIGS. 4A-4E illustrate example adjustments of slave charging currents according to the principles of the present disclosure.

FIGS. 4A-4E show example adjustments of the slave charging currents with respect to adjustments of the master charging current in various embodiments. In FIG. 4A, each of the slave charging currents are adjusted to one half of the master charging current. At a maximum total charging current, the master charging current is 3 amps and each of the slave charging currents is 1.5 amps. When the master charging current is decreased to 2 amps (e.g., when the state of charge is greater than 40%), the slave charging currents are decreased to 1 amp. When the master charging current is decreased to 1 amp (e.g., when the state of charge is greater than 50%), the slave charging currents are decreased to 0.5 amps.

Figure 4B:
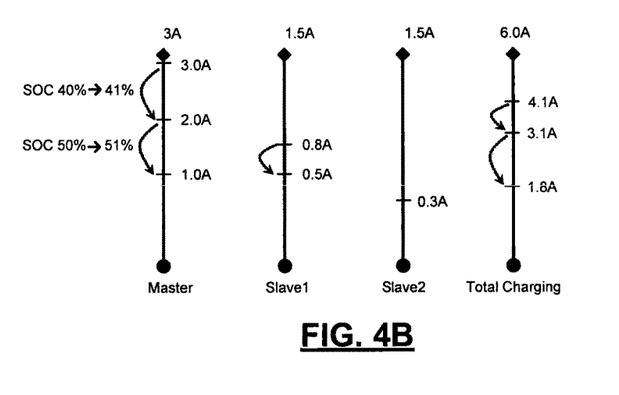

In an example shown in FIG. 4B, when the master charging current is 3 amps, the slave charging currents are 0.8 amps and 0.3 amps, respectively, and the total charging current is 4.1 amps. When the master charging current decreases to 2 amps, the slave charging currents remain at 0.8 amps and 0.3 amps, respectively. When the master charging current decreases to 1 amp, one slave charging current decreases to 0.5 amps while the other slave charging current remains at 0.3 amps.

Figure 4C:
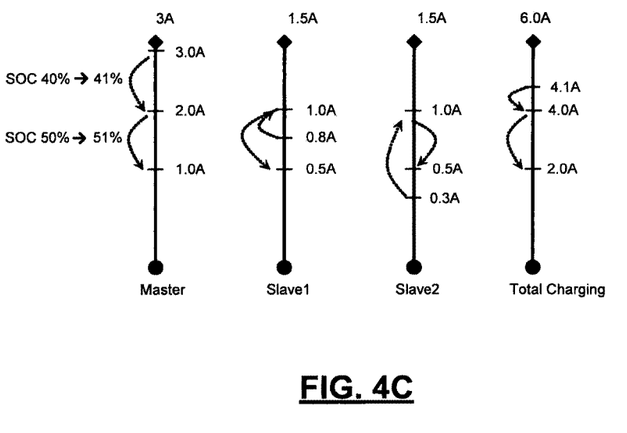

In an example shown in FIG. 4C, when the master charging current is 3 amps, the slave charging currents are 0.8 amps and 0.3 amps, respectively, and the total charging current is 4.1 amps. When the master charging current decreases to 2 amps, the slave charging currents increase to 1 amp and 1 amp, respectively. When the master charging current decreases to 1 amp, the slave charging currents decrease to 0.5 amps and 0.5 amps, respectively.

Figure 4D:
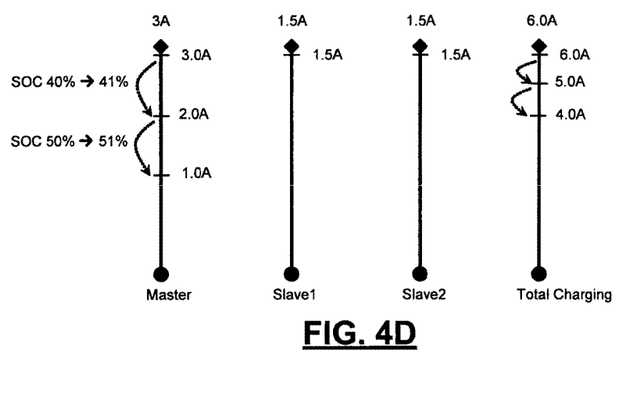
Figure 4E:
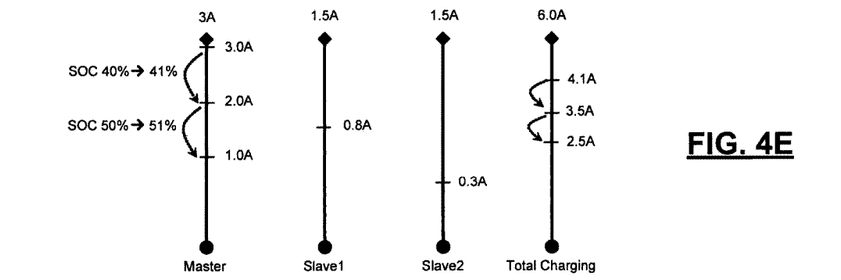

In an example shown in FIG. 4D, when the master charging current is 3 amps, the slave charging currents are each 1.5 amps and the total charging current is 6 amps. When the master charging current decreases to 2 amps or 1 amp, the slave charging currents remain at 1.5 amps. Conversely, in an example shown in FIG. 4E, when the master charging current is 3 amps, the slave charging currents are 0.8 amps and 0.3 amps, respectively, and the total charging current is 4.1 amps. When the master charging current decreases to 2 amps or 1 amp, the slave charging currents remain at 0.8 amps and 0.3 amps. In other words, in these embodiments, only the master charging current is adjusted.

Figure 5A:
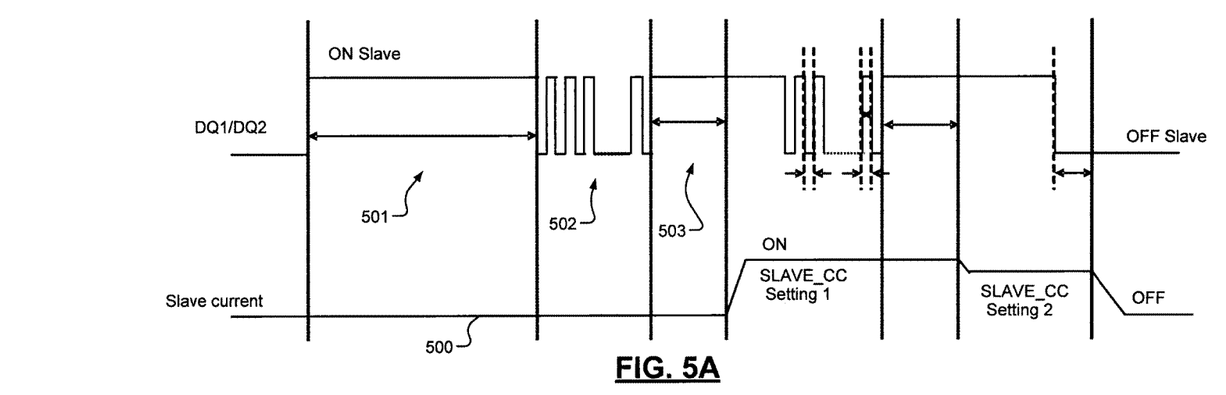
FIG. 5A illustrates example control of a slave charging current according to the principles of the present disclosure.

FIG. 5A shows example control of a slave charging current 500. The slave charging current 500 is selectively turned on to a first value (setting 1), a second value (setting 2), and OFF, responsive to a control signal DQ1/DQ2 (e.g., corresponding to a signal transmitted by the master charger via interface 260). For example, the control signal transitions to a high state for a first period 501 to indicate a start of transmission. For example, the first period corresponds to a predetermined delay. The control signal provides one or more pulses in a second period 502 to program the slave charger. For example, the number of pulses provided may control which setting (i.e., the value of the slave charging current) is selected. The control signal may again transition to a high state for a third period 503 to indicate an end of the programming of the slave charger. The slave charger may begin to provide the corresponding current at the end of the third period 503. The control signal may subsequently indicate additional programming periods to select a different setting, turn off the slave charger, etc.

Figure 5B:
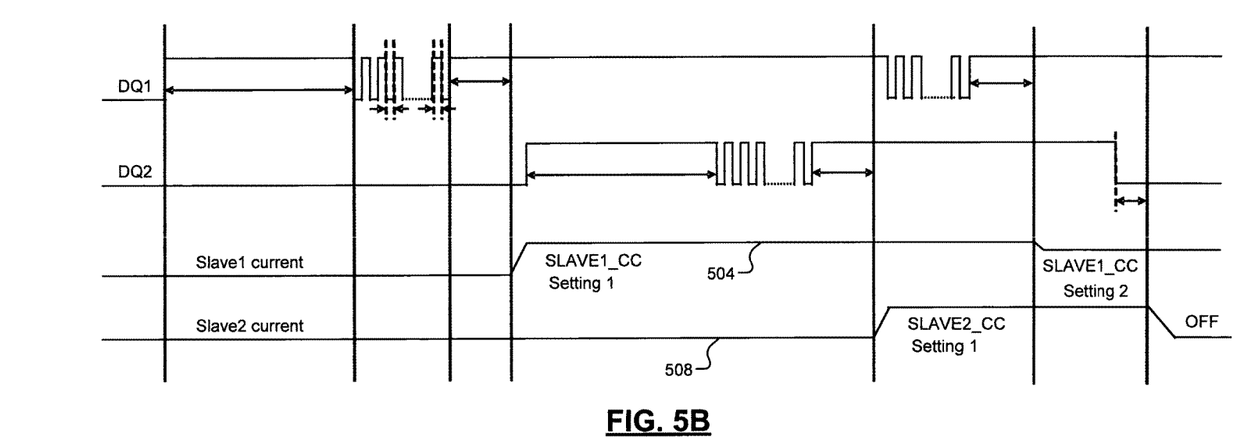
FIG. 5B illustrates example control of multiple slave charging currents according to the principles of the present disclosure.

FIG. 5B shows example control of slave charging currents 504 and 508 of respective slave chargers. The slave charging current 504 is selectively turned on to a first value (setting 1), a second value (setting 2), and OFF responsive to signal DQ1 (e.g., corresponding to a signal transmitted by the master charger via interface 260). Conversely, the slave charging current 508 is selectively turned on to the first value (setting 1) and OFF responsive to signal DQ2.

Figure 6:
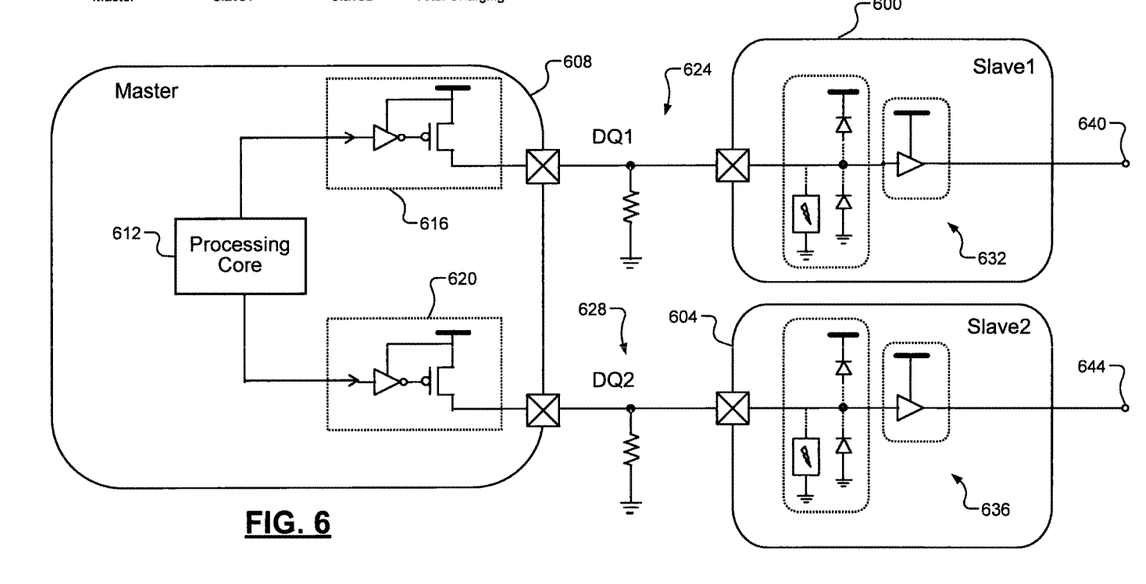
FIG. 6 shows example control of multiple slave chargers using respective signals according to the principles of the present disclosure.

FIG. 6 shows example control of slave chargers 600 and 604 using respective signals DQ1 and DQ2 provided by a master control module 608 (e.g., corresponding to master-slave control module 244, master control module 232, etc.). The master control module 608 includes a processing core (e.g., a digital processing core including a processor, memory, etc.) 612 configured to generate control signals corresponding to the slave chargers 600 and 604. For example, the master control module 608 includes a first slave charger control interface 616 and a second slave charger control interface 620. The master control module 608 provides control signals DQ1 and DQ2 to the slave chargers 600 and 604 via the interfaces 616 and 620 and responsive to commands from the processing core 612. For example only, the signals DQ1 and DQ2 may be provided via respective single pin interfaces 624 and 628. The slave chargers 600 and 604 include input driver circuits 632 and 636 configured to control respective input driver signals 640 and 644 according to the signals DQ1 and DQ2.

Figure 7:
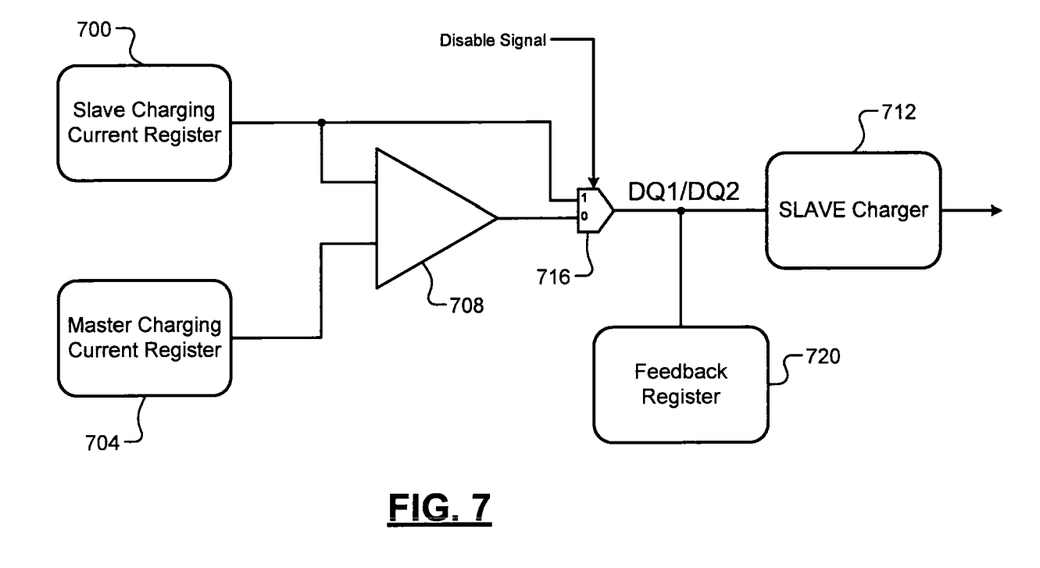
FIG. 7 is an example implementation of a selection between a stored slave charging current value and a master charging current value according to the principles of the present disclosure.

In some examples, the battery charging system may store a slave charging current value and a master charger current value (e.g., in respective registers). These values may be compared (e.g., using a comparator) and the lower of these two values is output to the slave charger to control the slave charging current. This selection may be disabled to selectively allow the slave charging current to be greater than the master charging current in various modes. FIG. 7 shows an example implementation of a selection between a stored slave charging current value and a master charging current value (e.g., as performed by processing core 612). For example, a slave charging current value is stored in a slave charging current register 700 and a master charging current value is stored in a master charging current register 704. A comparator 708 receives the slave charging current value and the master charging current value and is configured to output the lower of the two values to be output to slave charger 712 as the control signal (e.g., DQ1, DQ2, etc.).

In this manner, the slave charger 712 can be controlled such that the slave charging current is always less than or equal to the master charging current. In some examples, the output of the comparator 708 may be disabled. For example, a selector, such as a multiplexer 716, may selectively provide the output of the comparator 708 or the slave charging current value according to a disable signal. In other words, a state of the disable signal allows the slave charging current value to be selectively output regardless of whether the slave charging current value is less than the master charging current value. The output of the multiplexer 716 may be provided as feedback, and may be stored in a feedback register 720.

Figure 8:
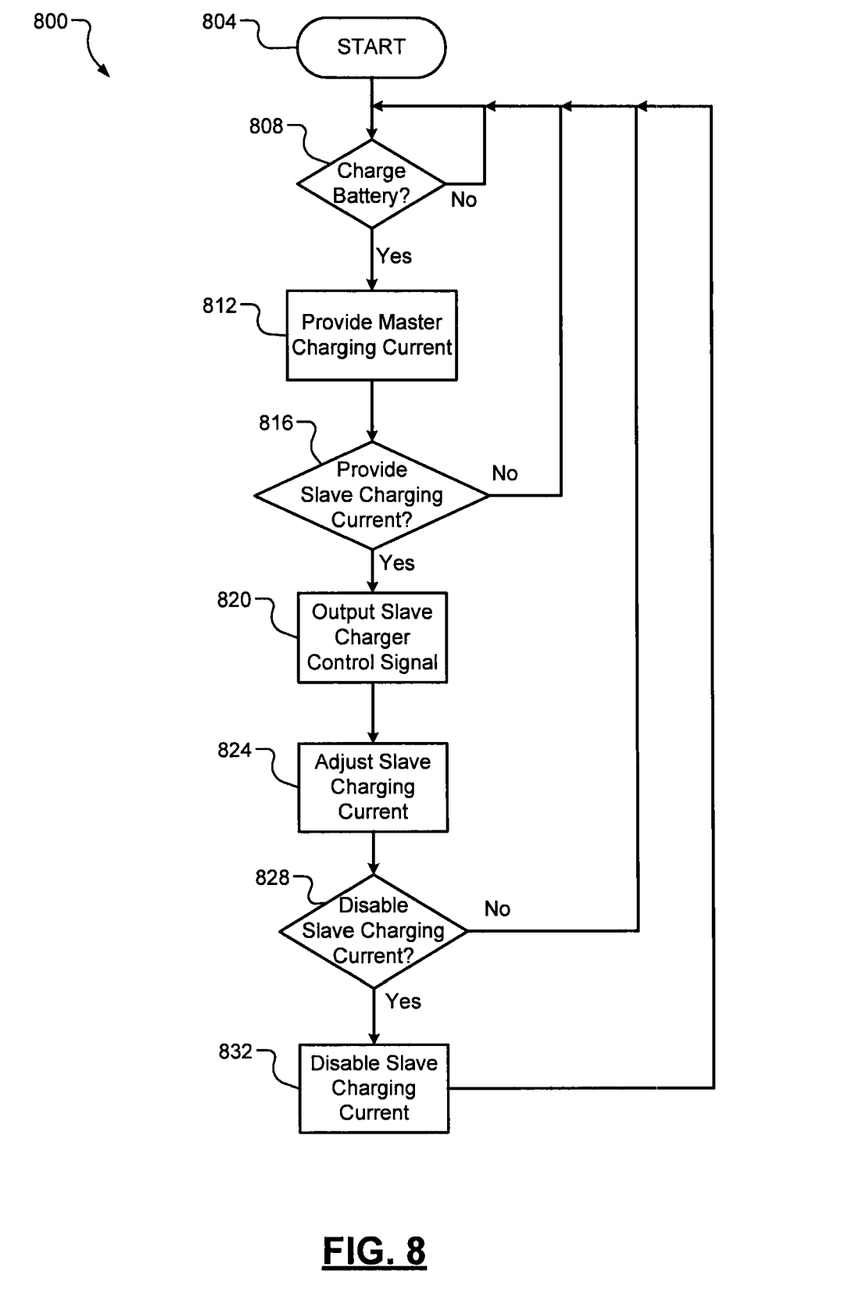
FIG. 8 is an example charging method according to the principles of the present disclosure.

Referring now to FIG. 8, an example charging method 800 begins at 804. At 808, the method 800 (e.g., a master charger) determines whether to charge a battery of a device. For example, the method 800 determines whether to charge the battery based on a command received from a control module, based on one or more sensed conditions (e.g., a state of charge of the battery), etc. If true, the method 800 continues to 812. If false, the method 800 continues to 808. At 812, the method 800 provides (e.g., outputs using the master charger) a master charging current (e.g., based on a received supply voltage).

At 816, the method 800 (e.g., the master charger) determines whether to provide a slave charging current. For example, the method 800 determines whether to provide the slave charging current based on a command received from the control module, based on one or more sensed conditions, etc. If true, the method 800 continues to 820. If false, the method 800 continues to 808.

At 820, the method 800 (e.g., the master charger) outputs a slave charger control signal to command a slave charger to output the slave charging current. At 824, the method 800 (e.g., the master charger and/or the slave charger) selectively adjusts the slave charging current. For example, the method 800 adjusts the slave charging current based on a command, one or more sensed conditions, etc. At 828, the method 800 (e.g., the master charger and/or the slave charger) determines whether to disable the slave charging current. If true, the method 800 continues to 832. If false, the method 800 continues to 808. At 832, the method 800 disables the slave charging current and continues to 808.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code, a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A battery charging system for charging a battery, the battery charging system comprising:
  a master charger that receives a supply voltage, outputs a master charging current to charge the battery based on the supply voltage, and selectively outputs a slave charger control signal; and
  at least one slave charger that receives the slave charger control signal from the master charger, receives the supply voltage, and selectively outputs a slave charging current to charge the battery based on the slave charger control signal and the supply voltage,
  wherein the master charger is configured to
    (i) selectively adjust the master charging current, and
    (ii) based on a state of charge of the battery, cause the at least one slave charger to adjust the slave charging current to a selected one of a plurality of non-zero current values in accordance with the adjustment to the master charging current, wherein, in response to the state of charge of the battery increasing, at least one of the master charging current and the slave charging current is decreased to decrease a total charging current provided to the battery.

2. The battery charging system of claim 1, wherein the master charger outputs the slave charger control signal using a single pin interface.

3. The battery charging system of claim 1, wherein the master charger outputs the slave charger control signal using a bi-directional interface.

4. The battery charging system of claim 1, further comprising a sense resistor connected in series with the battery, wherein the master charger receives feedback from the sense resistor indicative of the master charging current and the slave charging current.

5. The battery charging system of claim 1, wherein the master charger receives feedback indicative of the master charging current and the slave charging current provided to a battery.

6. The battery charging system of claim 1, wherein each of the master charger and the at least one slave charger are arranged to charge a same cell of the battery.

7. The battery charging system of claim 1, wherein the master charger selectively enables, disables, and adjusts the slave charging current using the slave charger control signal.

8. The battery charging system of claim 7, wherein the master charger selectively enables and disables the slave charging current based on an operating mode of the battery charging system.

9. A method for operating a battery charging system to charge a battery, the method comprising:
using a master charger,
receiving a supply voltage,
outputting a master charging current to charge the battery based on the supply voltage, and
selectively outputting a slave charger control signal;
using at least one slave charger,
receiving the slave charger control signal from the master charger;
receiving the supply voltage, and
selectively outputting a slave charging current to charge the battery based on the slave charger control signal and the supply voltage;
selectively adjusting the master charging current; and based on a state of charge of the battery, causing the at least one slave charger to adjust the slave charging current to a selected one of a plurality of non-zero current values in accordance with the adjustment to the master charging current, wherein, in response to the state of charge of the battery increasing, at least one of the master charging current and the slave charging current is decreased to decrease a total charging current provided to the battery.

10. The method of claim 9, further comprising outputting the slave charger control signal using a single pin interface.

11. The method of claim 9, further comprising outputting the slave charger control signal using a bi-directional interface.

12. The method of claim 9, further comprising connecting a sense resistor in series with the battery and providing feedback from the sense resistor indicative of the master charging current and the slave charging current.

13. The method of claim 9, further comprising receiving feedback indicative of the master charging current and the slave charging current provided to a battery.

14. The method of claim 9, wherein each of the master charging current and the slave charging current are provided to charge a same cell of the battery.

15. The method of claim 9, further comprising selectively enabling, disabling, and adjusting the slave charging current using the slave charger control signal.

16. The method of claim 15, further comprising selectively enabling and disabling the slave charging current based on an operating mode of the battery charging system.

* * * * *